(12) United States Patent
Bai et al.

(10) Patent No.: US 9,021,049 B2
(45) Date of Patent: Apr. 28, 2015

(54) METHOD AND APPARATUS FOR AUGMENTING SMARTPHONE-CENTRIC IN-CAR INFOTAINMENT SYSTEM USING VEHICLE WI-FI/DSRC

(75) Inventors: Fan Bai, Ann Arbor, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 453 days.

(21) Appl. No.: 13/278,797

(22) Filed: Oct. 21, 2011

(65) Prior Publication Data

US 2013/0103779 A1    Apr. 25, 2013

(51) Int. Cl.
*G06F 15/167* (2006.01)
*H04L 29/08* (2006.01)
*G07B 15/06* (2011.01)
*H04H 20/62* (2008.01)

(52) U.S. Cl.
CPC .......... *H04L 67/2833* (2013.01); *G07B 15/063* (2013.01); *H04H 20/62* (2013.01); *H04L 67/12* (2013.01)

(58) Field of Classification Search
USPC .................................................. 709/213, 200
See application file for complete search history.

(56) References Cited

U.S. PATENT DOCUMENTS

| | | | |
|---|---|---|---|
| 7,720,686 B2 * | 5/2010 | Volk et al. .................. 700/94 |
| 8,484,311 B2 * | 7/2013 | Svendsen et al. ............. 709/217 |
| 2002/0142759 A1 * | 10/2002 | Newell et al. .................. 455/414 |
| 2003/0005455 A1 * | 1/2003 | Bowers ........................... 725/90 |
| 2003/0055924 A1 * | 3/2003 | Matsugatani ................. 709/220 |
| 2003/0093476 A1 * | 5/2003 | Syed .............................. 709/204 |
| 2006/0069740 A1 * | 3/2006 | Ando et al. .................... 709/217 |
| 2006/0123080 A1 * | 6/2006 | Baudino et al. ............... 709/204 |
| 2007/0061067 A1 * | 3/2007 | Zeinstra et al. ............... 701/200 |
| 2007/0233725 A1 * | 10/2007 | Michmerhuizen et al. ... 707/102 |
| 2007/0238475 A1 * | 10/2007 | Goedken ....................... 455/512 |
| 2007/0282495 A1 * | 12/2007 | Kempton et al. ............... 701/22 |
| 2008/0033805 A1 * | 2/2008 | Padin ............................. 705/14 |
| 2008/0159135 A1 * | 7/2008 | Caram ......................... 370/230 |
| 2009/0157842 A1 * | 6/2009 | Shaffer et al. ................. 709/217 |
| 2010/0043020 A1 * | 2/2010 | Basso et al. ....................... 725/1 |
| 2010/0153228 A1 * | 6/2010 | Ahmavaara ..................... 705/26 |
| 2010/0216401 A1 * | 8/2010 | Kitahara ....................... 455/41.2 |
| 2010/0280956 A1 * | 11/2010 | Chutorash et al. .............. 705/64 |
| 2011/0047566 A1 * | 2/2011 | Matuchniak et al. ........... 725/29 |
| 2011/0140960 A1 * | 6/2011 | Wirola et al. ............. 342/357.42 |
| 2011/0314505 A1 * | 12/2011 | Cho et al. ......................... 725/62 |
| 2012/0071097 A1 * | 3/2012 | Matsushita et al. ........... 455/41.2 |
| 2012/0295664 A1 * | 11/2012 | Walker et al. ................. 455/561 |
| 2013/0138714 A1 * | 5/2013 | Ricci ............................. 709/201 |
| 2013/0166760 A1 * | 6/2013 | Rayavarapu et al. ......... 709/227 |
| 2013/0226401 A1 * | 8/2013 | Wang et al. ..................... 701/36 |
| 2014/0051346 A1 * | 2/2014 | Li et al. ........................ 455/3.01 |

* cited by examiner

*Primary Examiner* — Anthony Mejia
(74) *Attorney, Agent, or Firm* — John A. Miller; Miller IP Group, PLC

(57) ABSTRACT

A method and system for augmenting smartphone-centric in-car infotainment systems using Wi-Fi or DSRC communications between a vehicle and surrounding infrastructure. One or more smartphones or other electronic devices within a vehicle electronically communicate with the vehicle via a wireless protocol, such as Bluetooth, or a wired connection. The electronic devices run applications which submit requests for internet-based files or data, such as web pages, audio or video files. The vehicle brokers these requests and, using its own external wireless communications systems, such as Wi-Fi or DSRC, retrieves as many of the files or data as possible whenever internet access is available via an external wireless connection. The vehicle then provides the files or data to the requesting electronic devices. A token-based method for prioritizing the requests and rendering the data to the electronic devices is also disclosed.

18 Claims, 3 Drawing Sheets

METHOD AND APPARATUS FOR AUGMENTING SMARTPHONE-CENTRIC IN-CAR INFOTAINMENT SYSTEM USING VEHICLE WI-FI/DSRC

BACKGROUND OF THE INVENTION

1. Field of the Invention

This invention relates generally to using a vehicle's external wireless communication capability to augment data streaming to electronic devices in the vehicle and, more particularly, to a method and system for joining a vehicle to Wi-Fi or DSRC networks as they are available to the vehicle, and using the Wi-Fi or DSRC bandwidth for streaming files and data to personal electronic devices within the vehicle, where the devices may communicate with the vehicle via a wired connection or a dedicated wireless network within the vehicle.

2. Discussion of the Related Art

Cell phones have become increasingly sophisticated in recent years, to the point where they are commonly used for email, internet access, and a wide variety of special-purpose applications, in addition to their utility as a phone. Cell phones with such capability are often referred to as smartphones. Smartphones are typically designed to allow wireless Local Area Network (wireless LAN, also known as Wi-Fi) or other wireless communications to be used for all applications except actual cell phone calls. However, in absence of Wi-Fi or other wireless communication channels, the cellular communication network is used to deliver data for all applications on demand.

Because of the wealth of applications supported by smartphones, many modern vehicles now support seamless integration of one or more smartphones with the vehicles' infotainment systems. For example, a smartphone could be used to stream music from an internet radio service to be played over a vehicle's audio system, or the smartphone could access an internet-based video-sharing site and display the videos on the vehicle's rear-seat entertainment screen. Many vehicles support integration of smartphones using wireless communication technologies, such as Bluetooth and Wi-Fi, within the vehicle.

Other types of electronic devices are also frequently used in vehicles. Such devices include tablet-type computers and ebook readers, laptop computers, MP3 music players, gaming devices and others. Some of these devices may have cellular communications capability, while others do not. However, many such devices have some sort of wireless communication capability—such as Bluetooth or Wi-Fi—which allow the devices to transfer files and data when network services are available. These devices may also have hardwire-connection data transfer capability.

Many smartphone-based applications, such as audio and video streaming, are very data-intensive and thus bandwidth-intensive, which can lead to poor performance and/or high data-usage charges over the cellular network. In addition, Wi-Fi communications from smartphones and other electronic devices in a vehicle are seldom effective, because the vehicle is constantly passing in and out of range of wireless access points, thus rendering the wireless communications too sporadic to be useful. A vehicle with an external antenna, however, may have far better wireless network reception than a handheld device within the vehicle. There is a need for a system which takes full advantage of a vehicle's external wireless communications bandwidth, and makes this bandwidth available to electronic devices within the vehicle.

SUMMARY OF THE INVENTION

In accordance with the teachings of the present invention, a method and system are disclosed for augmenting smartphone-centric in-car infotainment systems using Wi-Fi or DSRC communications between a vehicle and surrounding infrastructure. One or more smartphones or other electronic devices within a vehicle electronically communicate with the vehicle via a wireless protocol, such as Bluetooth, or a wired connection. The electronic devices run applications which submit requests for internet-based files or data, such as web pages, audio or video files. The vehicle brokers these requests and, using its own external wireless communications systems, such as Wi-Fi or DSRC, retrieves as many of the files or data as possible whenever internet access is available via an external wireless connection. The vehicle then buffers the retrieved data and provides the files or data to the requesting electronic devices. A token-based method for prioritizing the requests and rendering the data to the electronic devices is also disclosed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to augmenting smartphone-centric in-car infotainment systems using Wi-Fi or DSRC communications is merely exemplary in nature, and is in no way intended to limit the invention or its applications or uses.

Wireless communication systems have become an important part of everyday life. Modern vehicles have embraced this trend by incorporating onboard wireless communication systems—both systems which are fully embedded in the vehicle, and vehicle-based systems which can link with portable consumer electronic devices carried by a driver or passenger.

Many portable electronic devices, which can be connected to a vehicle's information and entertainment (infotainment) system, support data download from various internet sources if a suitable network connection is available. Smartphones can use their cellular phone network for internet data download, but this can incur high data usage charges. For example, listening to high-definition internet radio (at 128 kilobits per second) consumes on the order of 60 megabytes per hour. Viewing standard definition videos from an internet video-sharing site (at 384 kilobits per second) consumes on the order of 180 megabytes per hour. When considering that a typical commuter averages over an hour per day in his or her vehicle, it is readily apparent that continuous data downloads over the cellular network while driving could cause a user to exceed the monthly data download quota of most cell phone contracts. Excess data consumption over the cellular network is to be avoided, as it results in large surcharges on a user's cell phone bill. Doing as much data transfer as possible over non-cellular wireless networks is a good way to avoid these surcharges.

Other devices, not having a cellular transceiver, must rely on a direct internet connection—either wired or wireless—for data download. For example, one popular touch-screen music player has a wireless receiver and runs many applications which can tap into internet data sources, but has no cellular transceiver. A significant benefit would be realized by users of both smartphones and other electronic devices if the vehicle they are riding in could serve as a surrogate internet service provider. For the sake of simplicity, all electronic devices in the following discussion will be referred to as smartphones, but it is to be understood that the methods and system are applicable to any suitable electronic device, as discussed above.

Figure 1:
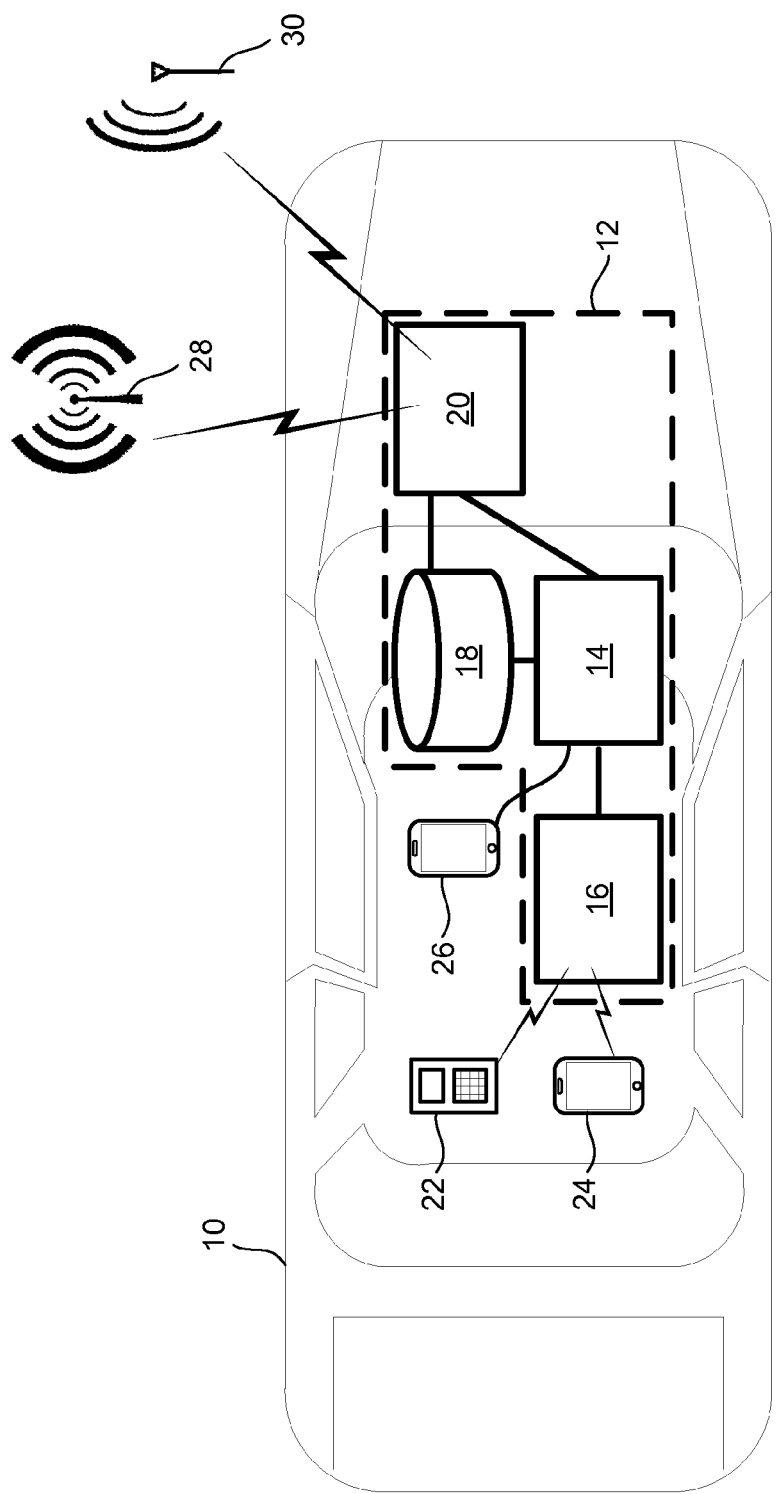
FIG. 1 is a block diagram illustration of a vehicle communications module which can be used to facilitate data transfer to electronic devices in a vehicle from wireless sources external to the vehicle.

FIG. 1 is a block diagram illustration of a vehicle 10 including a vehicle communications module 12 which can be used to facilitate data transfer to electronic devices in the vehicle 10 from external wireless sources. The vehicle communications module 12 includes a controller 14 communicating with an internal wireless module 16, a cache storage 18, and an external wireless module 20. The internal wireless module 16 manages wireless communication within the vehicle 10. The internal wireless module 16 could use Wi-Fi, Bluetooth, NFC or other wireless communication protocols, and could advantageously support more than one of these protocols. In practice, the vehicle communications module 12 could be packaged as a single physical unit, with connections to internal and external antennae (not shown) for wireless communications.

Wi-Fi is a name commonly used to represent wireless Local Area Network (LAN) communication based on the Institute of Electrical and Electronics Engineers' (IEEE) 802.11 standards. Originally an acronym for "wireless fidelity", the term Wi-Fi is now commonly used by the public as a synonym for IEEE 802.11 wireless LAN communication. Wi-Fi is a Radio Frequency (RF) communication technology. In a typical Wi-Fi environment, one or more electronic devices communicate with a wireless router or access point, where the router or access point is additionally connected to a Wide Area Network (WAN) and/or the Internet. Computers or other electronic devices wishing to wirelessly communicate with the access point must be within range of the RF signal, and if security has been implemented on the router or access point, connecting devices must also know and share an encryption key in order to be admitted. Wi-Fi is supported by many applications and devices including video game consoles, home networks, personal digital assistants, mobile phones (especially smartphones), computer operating systems, and other types of consumer electronics.

Bluetooth is an open, secure protocol for wirelessly exchanging data over short distances from fixed and mobile devices. Bluetooth uses radio frequency (RF) technology at 2.4 gigahertz or GHz ($2.4 \times 10^9$ cycle/sec), to wirelessly communicate between two or more devices, at a gross data rate of up to 1 mega-bit per second (Mb/s). Enhanced data rate versions of Bluetooth are capable of supporting higher data rates. Bluetooth provides a way to connect and exchange information between devices, such as mobile phones, computers, vehicle infotainment systems, printers, Global Positioning System (GPS) receivers, digital cameras, and video game consoles. When a device is said to be Bluetooth enabled, it means that device includes a small computer chip that contains the Bluetooth radio and software that enables that device to connect to other devices wirelessly using Bluetooth technology. Bluetooth is commonly used in vehicle environments, where a device can be securely "paired" to a vehicle in a one-time operation, and then automatically connected each time the device subsequently enters the vehicle.

Near Field Communication (NFC) is a very-short-range wireless connectivity technology that evolved from a combination of existing contactless identification and interconnection technologies. Products with built-in NFC can simplify the way consumer devices interact with one another, helping speed connections, receive and share information, and make fast and secure payments. Communication between two NFC-compatible devices occurs when they are brought within about two to four centimeters of one another. A simple wave or touch can establish an NFC connection, which is then compatible with other wireless technologies, such as Wi-Fi and Bluetooth. NFC could be used in conjunction with Wi-Fi and/or Bluetooth in the internal wireless module 16.

Smartphones 22, 24 and 26 are onboard the vehicle 10, with the smartphones 22 and 24 communicating wirelessly with the internal wireless module 16, and the smartphone 26 having a hardwired connection to the controller 14. Any one of the smartphones 22, 24 or 26 could be integrated with a vehicle infotainment system (not shown), for playing audio or video in the vehicle 10. However, integration with the infotainment system is not required. As long as the smartphones 22-26 are registered with the controller 14, as discussed below, they will be able to receive data from the internet via the vehicle communications module 12.

As will be discussed in detail below, the vehicle communications module 12 allows the smartphones 22-26 to request electronic content from the internet, where the requests are fulfilled when the external wireless module 20 establishes an internet connection via a Wi-Fi access point 28 or a DSRC access point 30. The external wireless module 20 is preferably designed to support both Wi-Fi and DSRC protocols, and establish connectivity with any such access point when within range. The Wi-Fi access point 28 could be located in a business (for example, free Wi-Fi in a coffee shop) or other location, and the DSRC access point 30 could be located in roadside infrastructure (for example, in a highway median, bridge, sign, or toll booth).

Dedicated Short Range Communications (DSRC) are one-way or two-way short-range to medium-range wireless communication channels specifically designed for automotive use. Regulatory authorities in the United States, Europe, and elsewhere have allocated a bandwidth spectrum in the 5.9 GHz (GigaHertz, or $10^9$ cycles/second) frequency band for DSRC, to be used by the Intelligent Transportation Systems (ITS). The decision to use the spectrum in the 5.9 GHz frequency range is due to its spectral environment and propagation characteristics, which are suited for vehicular environments. Waves propagating in this spectrum can offer high data rate communications for suitably long distances, up to 1000 meters, with low weather dependence. DSRC can be used in both public safety and private operations, in vehicle-to-vehicle and vehicle-to-infrastructure communication environments.

The vehicle communications module 12 operates as follows. One or more of the smartphones 22-26 registers with the controller 14. As discussed previously, the smartphones 22-26 can communicate wirelessly with the controller 14 via the internal wireless module 16, or they can communicate with the controller 14 via a hardwire connection, such as a USB cable. Each of the smartphones 22-26 which is registered submits a request for internet data to the controller 14. The request could take many different forms. For example, it could be a request to display a web page, a request to listen to an internet radio application, a request to download a file, or a request to view a video from a video-sharing site. Some of these requests imply a one-time data transfer of a certain size, and some of them imply a continuous data transfer bandwidth. Each time one of the smartphones 22-26 registers and submits a request for data, the controller 14 evaluates the request and determines whether it can be met. If sufficient internet data bandwidth is not available, the controller 14 can reject registration and data requests from one or more of the smartphones 22-26.

For data requests from the smartphones 22-26 which are accepted, the controller 14 combines them into an internet traffic aggregation which contains all required data downloads. The controller 14 then prioritizes and shapes the aggregated traffic list in an attempt to most fairly and efficiently balance available internet bandwidth. A token bucket method and various policies for prioritization are discussed in detail below. At this point, the controller 14 knows exactly what data it needs to retrieve from the internet. When internet access becomes available, via the external wireless module 20 communicating with either the Wi-Fi access point 28 or the DSRC access point 30, the controller 14 retrieves as much of the required data as possible. Incoming internet data can be sent from the external wireless module 20 directly to the cache storage 18, from where it can be rendered to the smartphones 22-26 as originally requested.

Although devices in the vehicle 10, such as the smartphones 22-26, could directly establish Wi-Fi connectivity with the Wi-Fi access point 28, tests have shown that signal strengths and data transfer rates are far superior if the smartphones 22-26 communicate with the vehicle communications module 12, and the vehicle communications module 12 uses its external wireless module 20, including an externally mounted antenna (not shown), for communication with the Wi-Fi access point 28. In addition, the vehicle communications module 12 can provide internet connectivity via the DSRC access point 30, whereas the smartphones 22-26 would have no built-in DSRC communications capability.

If a sufficient number of the Wi-Fi access points 28 and the DSRC access points 30 are available, the vehicle communications module 12 can provide essentially uninterrupted internet access and sufficient bandwidth for the smartphones 22-26 to run high-data-rate applications, such as audio and video. This level of service is possible due to the range and bandwidth of DSRC communications, and the rapidly expanding Wi-Fi infrastructure. Tests have shown that 30-40 megabytes of data can be downloaded to the vehicle communications module 12 in a single drive-by of an access point, such as the Wi-Fi access point 28 or the DSRC access point 30. Of course, if the vehicle 10 is parked within reception range of the Wi-Fi access point 28, for example, then continuous high-bandwidth internet access would be available to the smartphones 22-26 within the vehicle 10.

The external wireless module 20 can automatically establish communications with the Wi-Fi access point 28 when the access point 28 is running in unencrypted or unprotected mode. However, the controller 14 and the external wireless module 20 can also be configured to manage passwords for specific Wi-Fi access points 28 which are password-protected. An occupant of the vehicle 10 could provide a password for a specific Wi-Fi access point 28, and the controller 14 could retain the password and use it to allow the external wireless module 20 to automatically re-establish connectivity with the specific Wi-Fi access point 28 when it is encountered again in the future.

Figure 2:
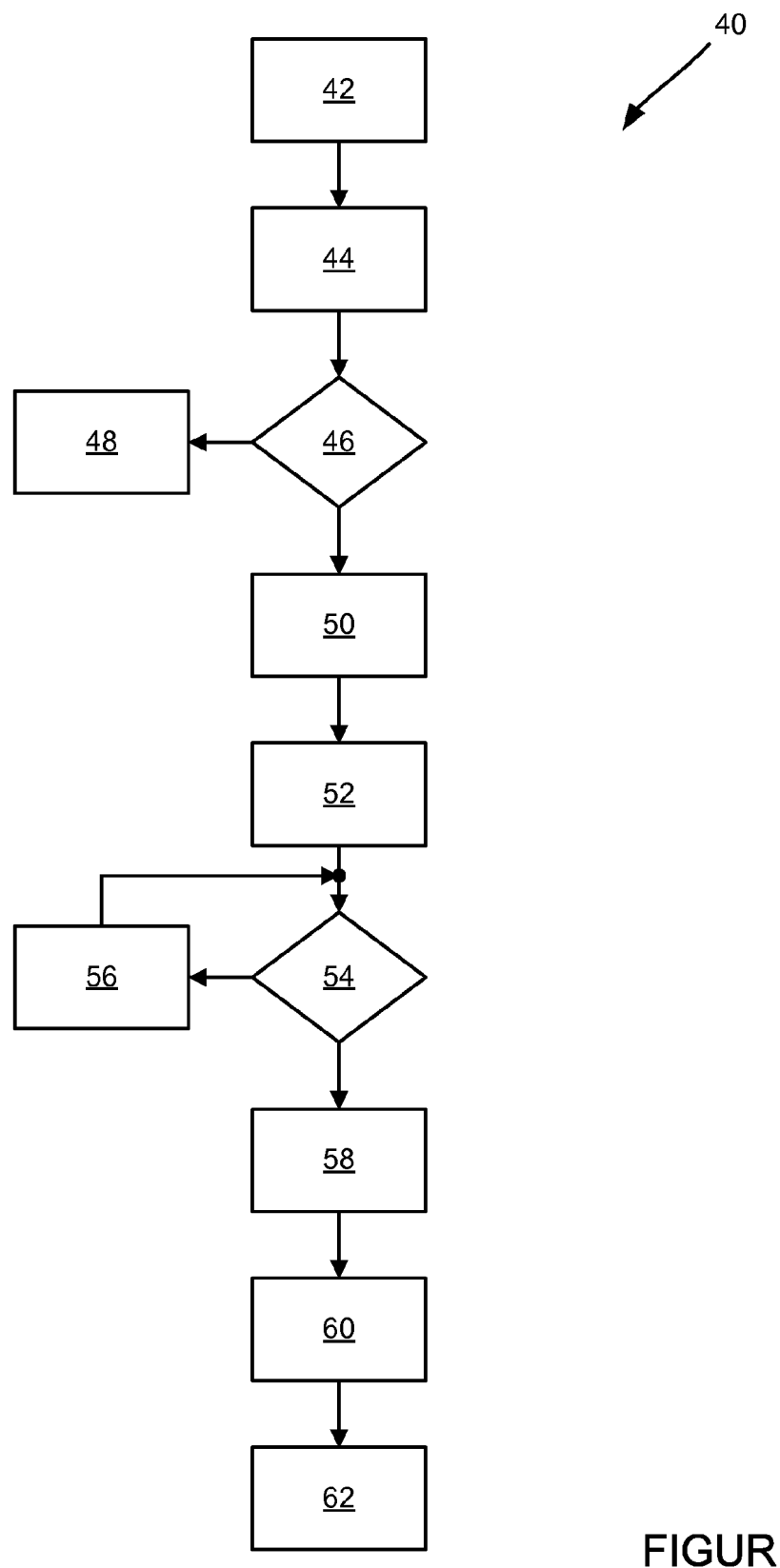
FIG. 2 is a flow chart diagram of a method for augmenting electronic device data transfer using a vehicle's external wireless communications capability.

FIG. 2 is a flow chart diagram 40 of a method for augmenting electronic device data transfer using a vehicle's external wireless communications capability, as implemented in the vehicle communications module 12 of FIG. 1. At box 42, a smartphone, such as the smartphone 22, registers with the controller 14. Registration of the smartphone 22 with the controller 14 simply establishes the smartphone 22 as a device seeking internet connectivity via the controller 14. It is to be understood that more than one smartphone, and other types of electronic devices, could be registered with the controller 14. The communication of the smartphone 22 with the controller 14 could be via a hardwired connection, or wireless communication via the internal wireless module 16.

At box 44, the smartphone 22 submits a request for data from the internet. The request could be in the form of a file to download, a web page to display, a video from a video-sharing site to be viewed, or an internet radio service to be listened to, as examples. Other types of data requests can also be supported. At decision diamond 46, the controller 14 determines if enough internet connectivity capacity exists to support the request from the smartphone 22. The request from the smartphone 22 is evaluated in view of any other requests that the controller 14 currently has. If sufficient capacity does not exist, the controller 14 rejects the request from the smartphone 22 at box 48. If rejected, the user of the smartphone 22 is free to submit another request at a later time.

At box 50, the controller 14 combines all accepted and as-yet unfulfilled data requests into an aggregated traffic list. The aggregated traffic list reflects all data which needs to be downloaded from the internet and provided to the smartphone 22 and any other registered devices. At box 52, the aggregated traffic list is prioritized and shaped into a prioritized file and connectivity list which designates what data will be downloaded from the internet, in what order, when internet connectivity is available. Prioritization policies used at the box 52 will be discussed below. At decision diamond 54, the controller 14 determines whether internet access is currently available via an external access point. If no internet access is currently available, then at box 56 the process waits for a predetermined amount of time, and then loops back to again check for internet access.

At box 58, when internet access is available via the external wireless module 20 communicating with the Wi-Fi access point 28 or the DSRC access point 30, the controller 14 commands the download of data from the internet according to the prioritized file and connectivity list from the box 52. At box 60, data downloaded from the internet is stored in the cache storage 18. Files in the cache storage 18 may be further processed at the box 60 as well. For example, a file may be partially downloaded while the external wireless module 20 is communicating with the Wi-Fi access point 28, but the connection may be lost before the file download is completed. Using existing breakpoint technology, the file download could be completed when the external wireless module 20 next establishes a connection, with the DSRC access point 30, for example.

At box 62, files and data downloaded from the internet are rendered to the smartphone 22 as requested. Data can be purged from the cache storage 18 when delivered to the smartphone 22. The process steps 42-62 can be repeated continuously as long as the vehicle 10 is in operation.

Figure 3:
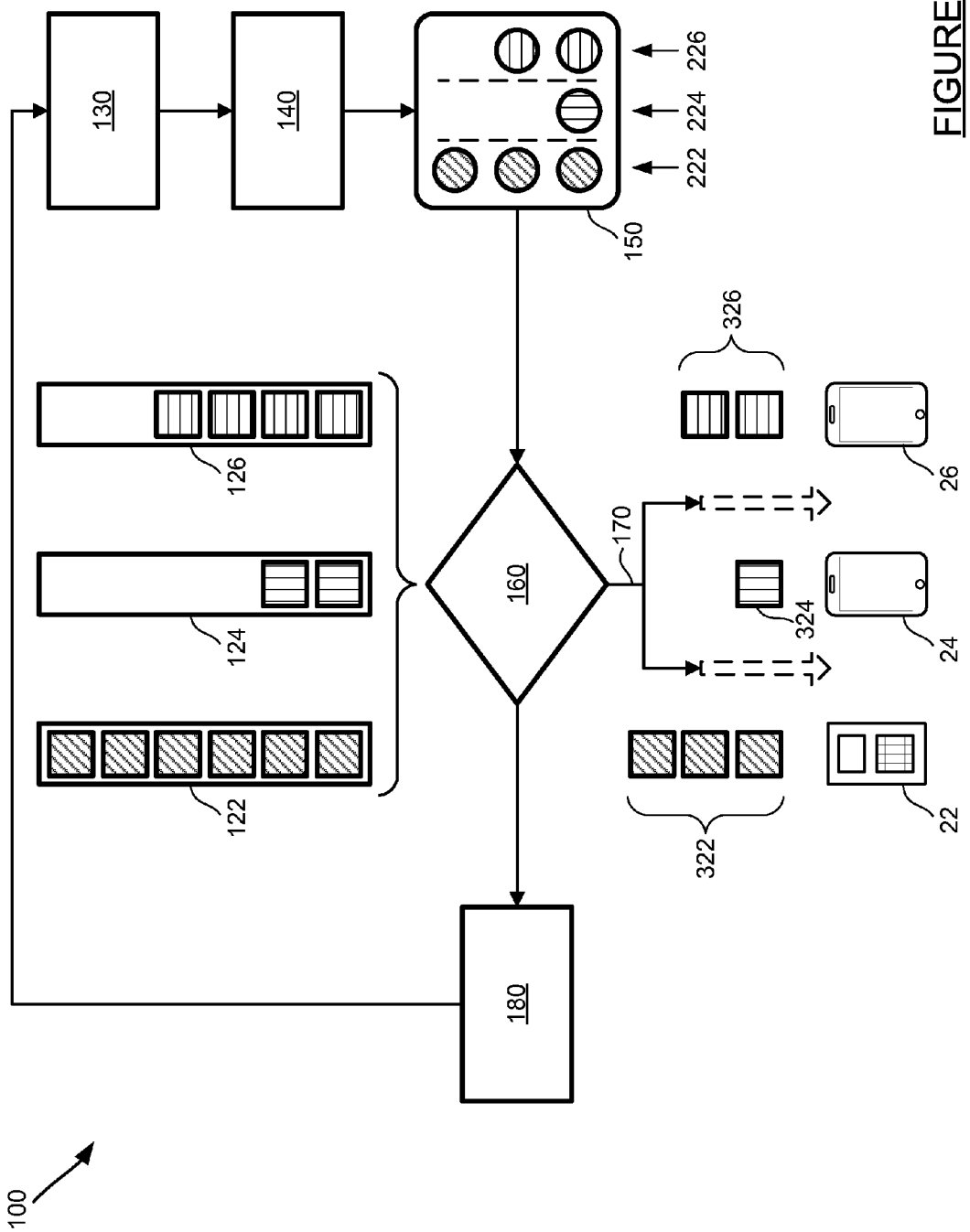
FIG. 3 is an illustrated flow chart diagram of a weighted token bucket algorithm which can be used to allocate available data transfer bandwidth among requesting electronic devices.

FIG. 3 is an illustrated flow chart diagram 100 of a weighted token bucket algorithm which can be used to allocate available data transfer bandwidth among requesting electronic devices. The algorithm shown on FIG. 3 could be run by the processor 14 discussed previously. The smartphones 22-26 are the same devices shown in FIG. 1. In FIG. 3, the smartphones 22-26 are assumed to be communicating with the vehicle communications module 12. Request lists 122, 124 and 126 each contain blocks which represent requests for data from the smartphones 22, 24 and 26, respectively, as discussed previously. In the request list 122, it can be seen that the smartphone 22 has the most requests pending, which could represent a request to view a lengthy video, for example. The smartphone 24 has the fewest requests pending, in the request list 124, which could represent a request to view a static web page, for example. The smartphone 26 has a moderate number of requests pending, in the request list 126, which could represent a file download request.

At box 130, the vehicle 10 encounters a wireless access point, such as the Wi-Fi access point 28, and generates a number of new tokens. The number of tokens generated upon connection to an access point may be fixed, or it may be a function of parameters such as the type of access point and the signal strength. In this example, for illustration purposes, there are six tokens generated. Each token represents a block of data or bandwidth to be parceled out to a connected wireless device. At box 140, the six tokens are assigned to the smartphones 22-26. In this example, the tokens are assigned based on the amount of data being requested by each device, but other allocation policies are possible, as discussed below. The assignment of the six tokens to the smartphones 22-26 produces the token allocation shown in box 150, where three tokens 222 are assigned to the smartphone 22, one token 224 is assigned to the smartphone 24, and two tokens 226 are assigned to the smartphone 26.

At decision diamond 160, the processor 14 determines whether tokens are available. Given the availability of the tokens 222, 224 and 226, data download to the smartphones 22-26 proceeds at arrow 170. The three tokens 222 allow for the download of data blocks 322 to the smartphone 22. The data blocks 322 represent the first three blocks of data from the request list 122 for the smartphone 22. Similarly, data blocks 324 and 326 are downloaded to the smartphones 24 and 26, respectively, based on the tokens 224 and 226. As data is downloaded to the smartphones 22-26, tokens can continue to be generated, and data requests fulfilled, as long as internet connectivity persists.

When internet connectivity via the wireless access point is lost and no more tokens are available at the decision diamond 160, the algorithm moves on to box 180, where it waits until another wireless access point is encountered, at which point it loops back to the box 130.

In the weighted token bucket allocation method discussed above, the allocation of tokens to the smartphones 22, 24 and 26 can be handled in a number of different ways. For example, one allocation policy may be to assign priority status to the first electronic device to register with the vehicle communications module 12, where priority status could mean that the prioritized electronic device receives all of its requested content before any other device receives any content, or it could mean the prioritized device receives proportionally more than other devices. Another policy would be to assign priority status to an electronic device which is integrated with the vehicle's infotainment system—that is, a device which can play audio over the vehicle's speakers or display video to the vehicle's video screens. Yet another allocation policy—the one illustrated in FIG. 3—would be to assign tokens using a weighting scheme which is dependent on the amount of content being requested by each device. Still another allocation policy would be equal sharing, where each registered device would receive the same amount of data content or bandwidth. Other allocation policies could also be envisioned.

Ultimately, any of the token allocations policies described above can be implemented. In fact, the allocation policy could be a user-configurable option in the vehicle infotainment system, as multiple different policies could easily be programmed into the processor 14 and made available for user selection via the infotainment system. As long as some allocation policy is in force at any given time, the methods disclosed above will be operable.

Using a vehicle's external wireless communications capability, including both Wi-Fi and DSRC, a significant amount of internet bandwidth can be provided to smartphones and other electronic devices onboard the vehicle. The users of smartphones can then benefit from reduced reliance on the cellular network for data downloads, while the users of other electronic devices can benefit from internet connectivity in a vehicle environment where such connectivity would not previously have been available.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for augmenting electronic device data transfer using a vehicle's external wireless communications capability, said method comprising:
    establishing communication between a plurality of electronic devices and a communications module in a vehicle;
    submitting a request list by each of the electronic devices, where the request list includes a list of requested files or data;
    accepting the request list if it can be fulfilled, or rejecting the request list and its electronic device if the request list cannot be fulfilled;
    combining the request list with any previously accepted request lists to produce an aggregated traffic list, including prioritizing the request list against the previously accepted request lists;
    retrieving files and data from the Internet according to the aggregated traffic list when an external wireless connection to the Internet is available; and
    downloading the files and data to the electronic devices.

2. The method of claim 1 wherein establishing communication between a plurality of electronic devices and a communications module in a vehicle includes using wireless communications within the vehicle.

3. The method of claim 2 wherein the wireless communications within the vehicle use a Bluetooth or Wi-Fi protocol.

4. The method of claim 1 wherein accepting the request list if it can be fulfilled includes determining whether the request list can be fulfilled by estimating a bandwidth requirement for the request list and evaluating the bandwidth requirement in addition to bandwidth required from previously accepted request lists.

5. The method of claim 1 wherein prioritizing the request list against the previously accepted request lists includes using a weighted token bucket algorithm which assigns tokens to each of the electronic devices, where the tokens represent data requests to be fulfilled.

6. The method of claim 5 wherein tokens are assigned in proportion to an amount of data being requested by each of the one or more electronic devices.

7. The method of claim 5 wherein more tokens are assigned to an electronic device which is integrated with an infotainment system in the vehicle than are assigned to other electronic devices.

8. The method of claim 1 wherein retrieving files and data from the Internet includes storing the files and data in a cache storage module before downloading the files and data to the electronic devices.

9. The method of claim 1 wherein the external wireless connection to the internet uses a Wi-Fi or Dedicated Short Range Communications (DSRC) protocol.

10. A method for augmenting data transfer to a smartphone integrated with a vehicle's infotainment system using external wireless communications capability, said method comprising:

establishing communication between the smartphone and a communications module in a vehicle, where the smartphone is also integrated with the vehicle's infotainment system;

submitting a request list by the smartphone, where the request list includes a list of requested files or data from the Internet;

establishing a connection to the Internet using external wireless communication with a Wi-Fi access point, a Dedicated Short Range Communications (DSRC) access point, or both;

retrieving files and data from the Internet according to the request list;

downloading the files and data to the smartphone for use by the infotainment system in the vehicle; and establishing communications between one or more other electronic devices and the communications module, submitting a request list by each of the other electronic devices, combining the request lists from the smartphone and the other electronic devices into an aggregated traffic list, retrieving files and data from the Internet according to the aggregated traffic list, and downloading the files and data to the smartphone and the other electronic devices.

11. The method of claim 10 wherein the smartphone and the other electronic devices communicate wirelessly with the communications module using Bluetooth or Wi-Fi protocols.

12. The method of claim 10 further comprising a weighted token bucket allocation, where tokens representing data requests to be fulfilled are assigned to the smartphone and each of the other electronic devices.

13. A vehicle communications system comprising:

an internal wireless module for facilitating wireless communications with one or more electronic devices within a vehicle;

an external wireless module for facilitating wireless communications between the vehicle and external wireless access points;

a cache storage module for storing data downloaded from the Internet via the external wireless access points; and a controller in communication with the internal wireless module, the external wireless module and the cache storage module, said controller being configured to receive data download request lists from the one or more electronic devices, combine the data download request lists into an aggregated traffic list, retrieve files and data from the Internet according to the aggregated traffic list when an external wireless connection to the Internet is available, store the files and data from the Internet in the cache storage module, and render the files and data to the one or more electronic devices.

14. The system of claim 13 wherein the internal wireless module supports both Bluetooth and Wi-Fi protocols.

15. The system of claim 13 wherein the external wireless module supports both Wi-Fi and Dedicated Short Range Communications (DSRC) protocols.

16. The system of claim 13 wherein one of the electronic devices is integrated with an infotainment system in the vehicle such that audio or video data downloaded from the Internet can be played in the vehicle.

17. The system of claim 13 wherein the controller is configured with a weighted token bucket algorithm which fulfills the data download request lists from each of the electronic devices using tokens, and the tokens are assigned based on a policy.

18. The system of claim 17 wherein the policy may be based on an amount of data requested by each of the electronic devices, an order of registration of each of the electronic devices, or an integration status of each of the electronic devices with an infotainment system in the vehicle.

* * * * *